US008776677B1

(12) United States Patent
Jackson, Jr. et al.

(10) Patent No.: US 8,776,677 B1
(45) Date of Patent: Jul. 15, 2014

(54) NUT SHELLING MACHINE AND METHOD

(76) Inventors: Auzville Jackson, Jr., Richmond, VA (US); Gerald Whitmer, Shenandoah Junction, WV (US)

(*) Notice: Subject to any disclaimer, the term of this patent is extended or adjusted under 35 U.S.C. 154(b) by 164 days.

(21) Appl. No.: 13/495,551

(22) Filed: Jun. 13, 2012

Related U.S. Application Data

(60) Provisional application No. 61/571,224, filed on Jun. 23, 2011.

(51) Int. Cl.
*A23N 5/00* (2006.01)

(52) U.S. Cl.
USPC ............ 99/576; 99/574; 99/617; 99/622

(58) Field of Classification Search
CPC ......... A23N 5/00; A23N 5/002; A23N 5/004; A23N 5/006; A23N 5/008; A23N 5/01; A23N 5/08
USPC ............ 99/574, 576, 571, 617, 619, 622, 618
See application file for complete search history.

(56) References Cited

U.S. PATENT DOCUMENTS

| 182,841 | A | * | 10/1876 | McMaster | 99/602 |
| 1,046,466 | A | * | 12/1912 | Jacobs | 99/575 |
| 1,983,441 | A | * | 12/1934 | Dowling | 460/123 |
| 2,354,096 | A | * | 7/1944 | Archer | 99/509 |
| 2,663,340 | A | * | 12/1953 | Goodwin | 99/575 |
| 4,317,411 | A | * | 3/1982 | Forrest et al. | 99/623 |

* cited by examiner

*Primary Examiner* — Reginald L Alexander

(57) ABSTRACT

A nut shelling apparatus and method for the shelling of nuts such as chinquapins and chestnuts without substantially damaging the meat of the nuts. The nut shelling machine utilizes a combination of the inertia of the nut and a planar rotating cutting disc, such as one with a layer of aluminum oxide abrasive material, to cut the shell of the nut in a series of small cuts. The rotating abrasive disc utilizes the resistive inertia of the nuts to launch the nut in an upward direction and causing the nuts to fall onto the abrasive surface to repeatedly cut the shells. The repeated cutting action results in removal of a substantial amount of the shell in a short period of time while at the same time minimizing damage to the meat of the nut.

15 Claims, 7 Drawing Sheets

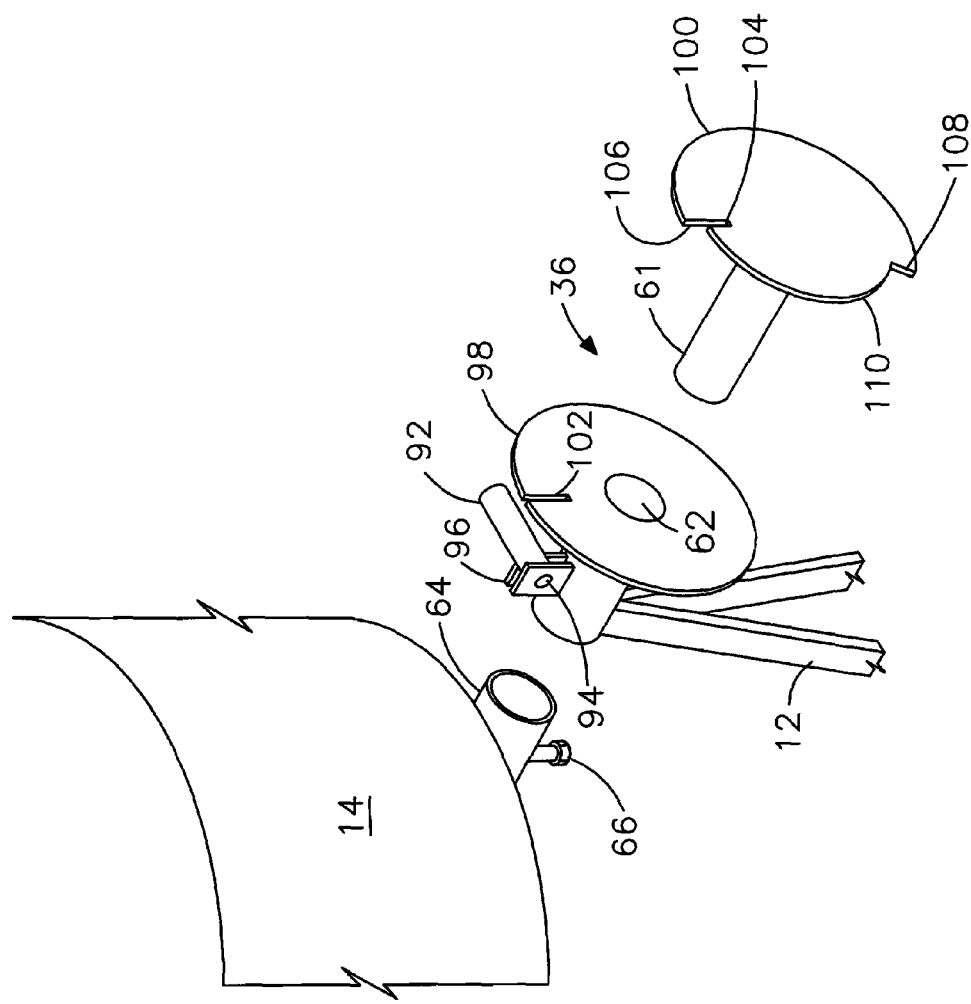

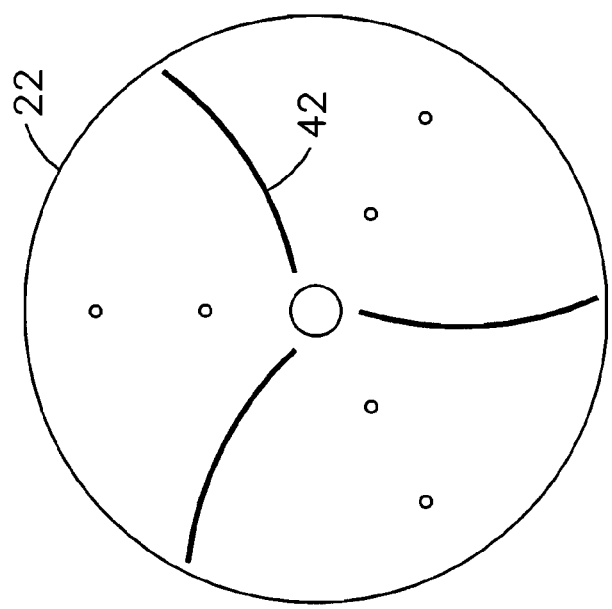
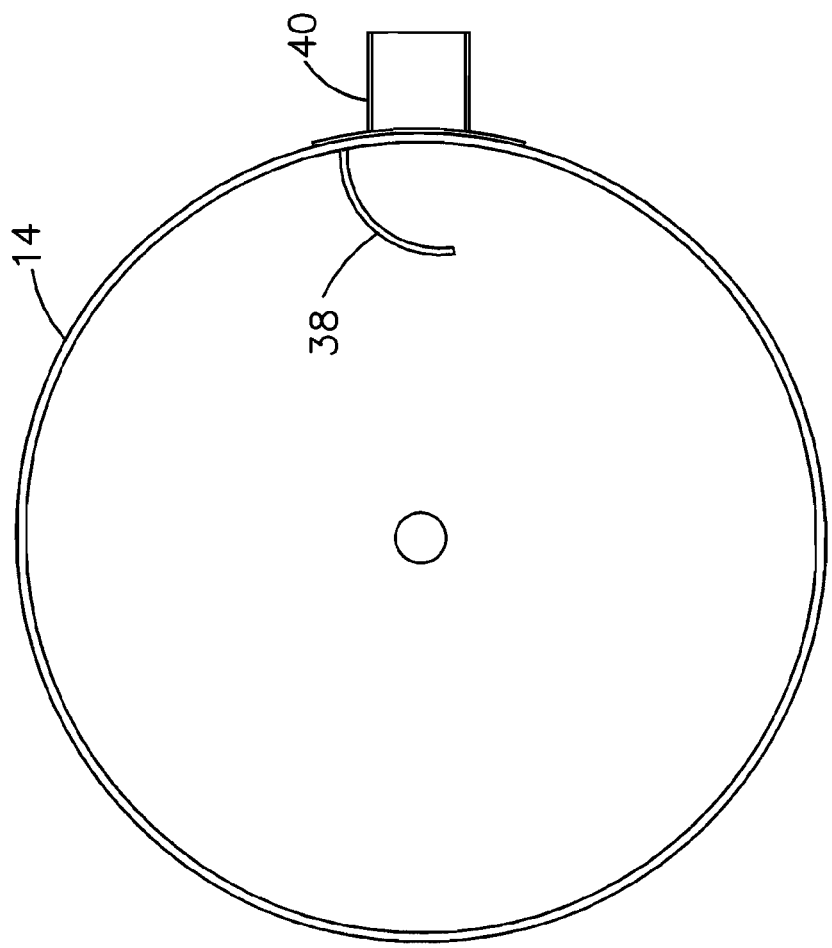
FIG. 9
FIG. 8

NUT SHELLING MACHINE AND METHOD

This application claims the benefit and priority date of Provisional Application 61/571,224 filed Jun. 23, 2011 in the names of Auzville Jackson, Jr. and Gerald Whitmer.

BACKGROUND OF THE INVENTION

1) Field of the Invention

This invention relates generally to a nut shelling machine, and more particularly to a machine and method for shelling nuts such as chestnuts and chinquapins.

2) Description of Related Art

Nut shelling apparatus to crack and shell various types and various sizes of nuts are known in the art. These devices range from simple table models to sophisticated production lines for shelling of some nuts in large quantity.

However, until the present invention no relatively simple machine has been developed that satisfactorily shells chinquapins or chestnuts or similar nuts at room temperature to remove the thin shell from the nut.

SUMMARY OF THE INVENTION

The present invention is a simple, safe and efficient nut shelling apparatus and method for shelling of nuts such as the chinquapin and chestnuts without substantially damaging the nuts' meat.

The nut shelling machine disclosed herein uses a combination of the inertia of the nut and a planar rotating cutting disc such as one with a layer of aluminum oxide abrasive material to cut the shell of the nut in a series of small cuts by utilizing the inertia of the nut to resist the cutting, launching the nut in a upward direction and permitting the nut to fall back onto the cutting or abrasive surface to again have a part of the shell cut, resulting in a substantial removal of the shell in a relatively short period of time without substantial damage to the meat of the nut.

| NOMENCLATURE | |
|---|---|
| 10. | Nut Shelling Machine |
| 12. | Base |
| 14. | Housing |
| 15. | Bottom of Housing |
| 16. | Cover |
| 17. | Upright Side of Housing |
| 18. | Hopper |
| 20. | Bottom Opening |
| 22. | Rotary Disc |
| 24. | Top Surface |
| 26. | Bottom Surface |
| 28. | Cutting Surface |
| 30. | Launchers |
| 32. | Motor |
| 34. | Adjustment Mechanism |
| 36. | Tilting and Locking Mechanism |
| 38. | Discharge Vane |
| 40. | Outlet or Discharge Chute |
| 42. | Rotating Discharge Vane |
| 44. | Spacing Lugs |
| 46. | Transparent Window |
| 48. | Holding Ring |
| 50. | Locking Handle |
| 52. | Adjustment Knob |
| 54. | Motor Controls |
| 56. | Outlet |
| 58. | Pivot Arrangement |
| 60. | Holding Tab |
| 61. | Pivot Rod |
| 62. | Bearing |
| 64. | Pivot Rod Holder |
| 66. | Set Screw |
| 68. | Motor Shaft |
| 70. | Bolts |
| 72. | Leading Angle |
| 74. | Circular Member |
| 76. | Adjustment Plate |
| 78. | Entry |
| 80. | Circular Cam |
| 82. | Welded Inner End of Adjustment Mechanism |
| 84. | Opening |
| 86. | Adjustment Cam |
| 88. | Welded Nut |
| 90. | Non-Welded Nut |
| 92. | Locking Handle |
| 94. | Locking Handle Pivot |
| 96. | Locking Handle Pivot Support |
| 98. | Fixed Locking Circular Member |
| 100. | Rotating Locking Circular Member |
| 102. | Fixed Slot |
| 104. | Rotating Slot |
| 106. | Top Stop Shoulder |
| 108. | Tilted Stop Shoulder |
| 110. | Circular Arc |

BRIEF DESCRIPTION OF THE DRAWINGS

Referring now to the drawings in which reference numerals indicate corresponding elements throughout the several views:

FIG. 7 is a schematic partial exploded view of the tilting and locking mechanism.

FIG. 8 is a downward looking view of the bottom of the housing showing the discharge vane and outlet.

FIG. 9 is a bottom view of the rotary disc showing the rotating discharge vanes.

DETAILED DESCRIPTION OF THE INVENTION

Figure 2:
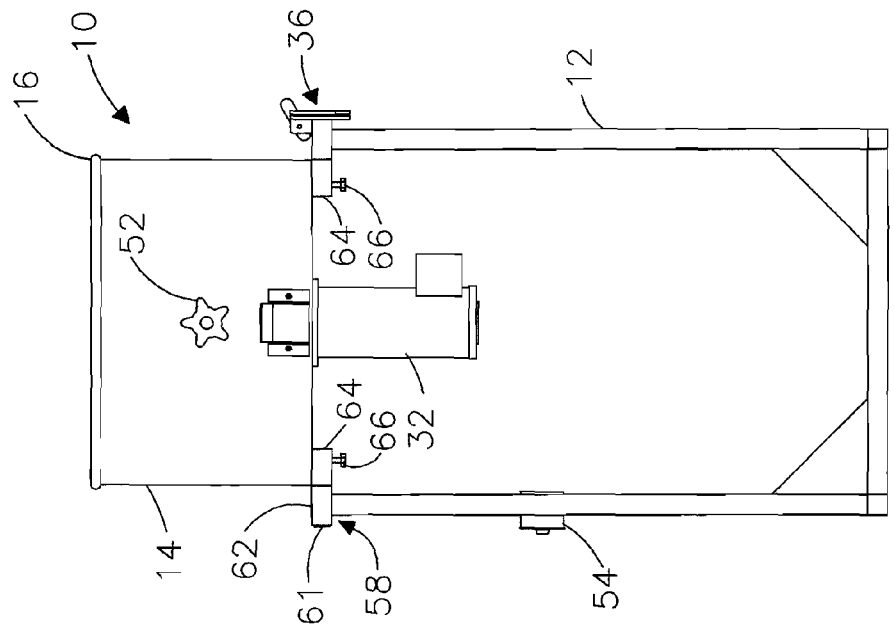
FIG. 2 depicts the machine from a front view showing the pivot arrangement and discharge chute.
Figure 1:
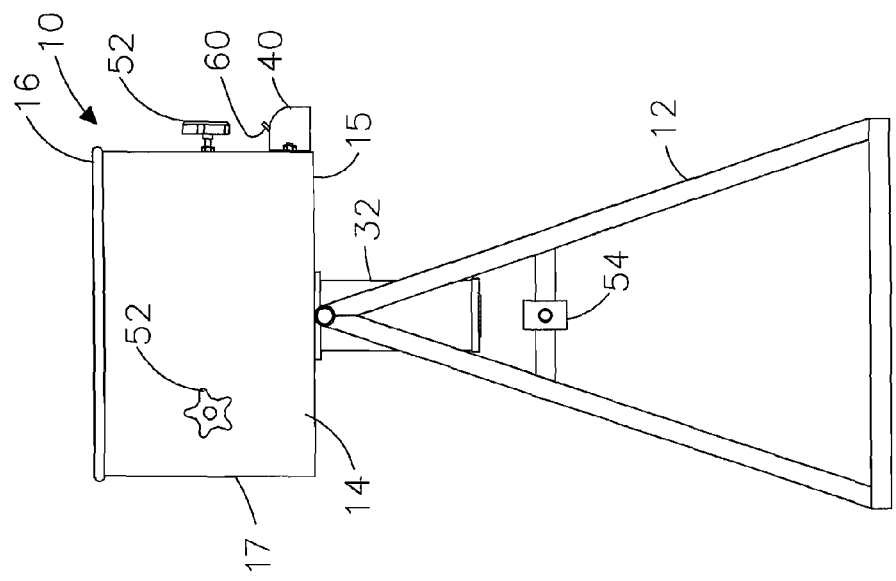
FIG. 1 is a side view of the nut shelling machine for shelling nuts.

With reference to FIGS. 1 and 2, there is shown the nut shelling machine 10, whose main parts are the base (12), the housing (14), the cover (16) of the housing, the motor (32), and the motor controller (54). The motor is preferably a ¼ to 2 horsepower 90 volt DC motor turning at 1,750 RPM, controlled by a multi-drive solid state DC speed controller accepting either of 120 or 240 volts AC, with an off-on switch and variable speed to permit the motor to be operated in a range of 0 to 1,750 RPM. Most preferably, the motor is a one half horsepower motor.

Also shown in FIG. 1 is an outlet (40), with a holding tab (60). The outlet (56) is designed to be removed and replaced by a nozzle inlet in the event a user wishes to connect a vacuum to withdraw debris and other material that empties from the outlet. The holding tab is for the convenient mounting of a bucket (not shown) whose handle is placed between the holding tab (60) and the housing (14). This permits the accommodation of standard buckets, especially well-known 5 gallon buckets.

The housing (14) has three adjustment knobs (52) spaced around the housing. The housing is designed to pivot from the upright position downward to permit the contents to be dumped. The housing includes a bottom 15 and an upright side 17.

With special reference to FIG. 2, there is shown the pivot arrangement (58), which includes a pivot rod (61) which passes through a bearing (62) to a pivot rod holder (64). The pivot rod holder has a set screw (66) for locking the rod in a permanent position. The pivot rod holder (64) is welded to the bottom 15 of the housing. On the right side of FIG. 2 is a similar arrangement, which also includes a tilting and locking mechanism (36).

Figure 3:
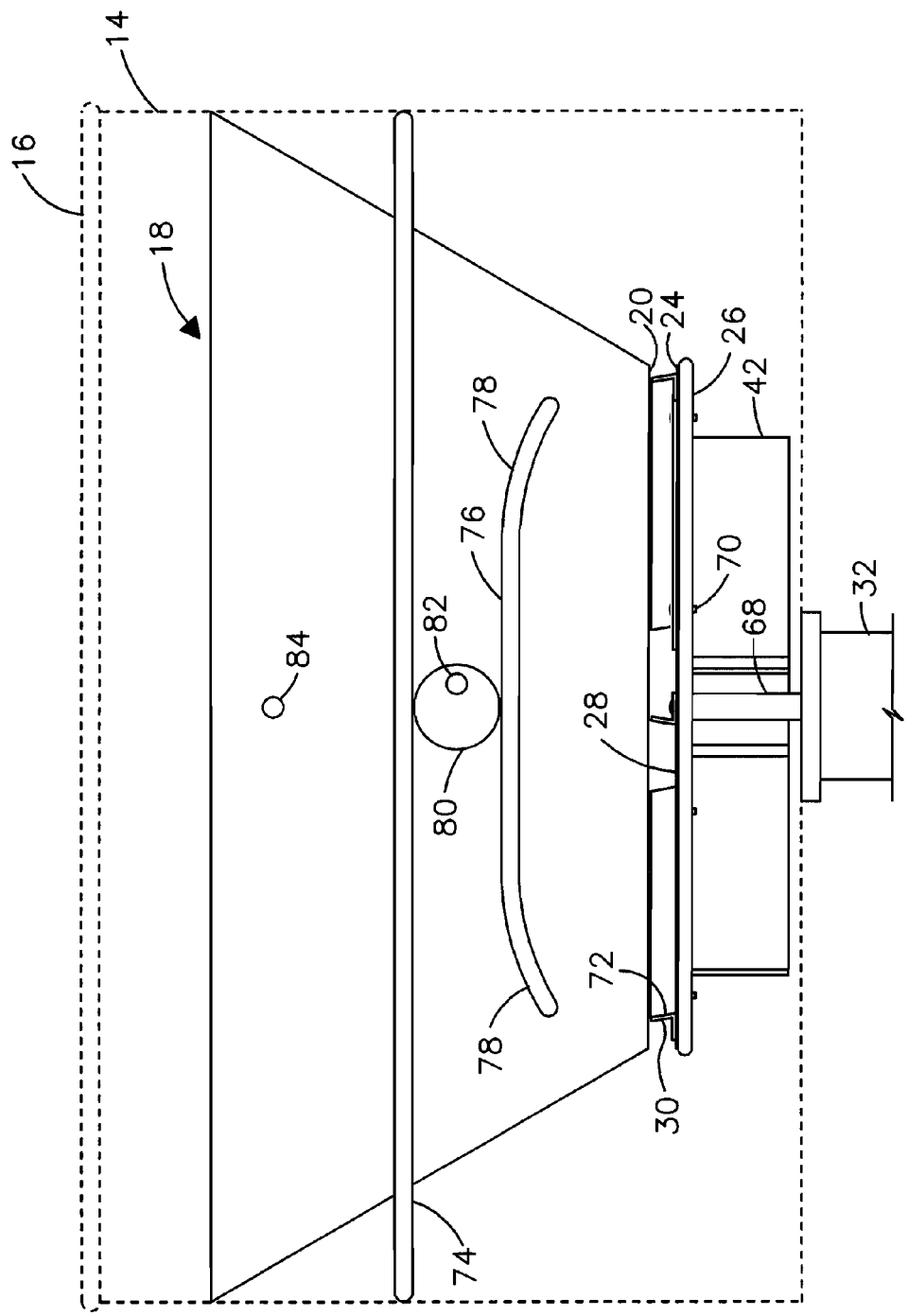
FIG. 3 is a schematic of the hopper part of the nut shelling machine shown in the inside of the housing.

With reference to FIG. 3, there is shown a hopper (18), a bottom opening (20), a rotary disc (22), having a top surface (24), and a bottom surface (26). Mounted on the top of the rotary disc is a cutting surface (28). The cutting surface is preferably an aluminum oxide coated 12 inch abrasive disc of either 24 grit or 36 grit available from Norton USA, Worchester, Mass. The abrasive disc is fixed to the top surface by a layer of adhesive. The aluminum oxide coated abrasive disc is a preferred choice, but a number of other types of cutting arrangements can be arranged to be carried on as an integral part of the rotary disc. Also carried by the rotary disc (22), on the bottom surface, are 3 rotating discharge vanes (42), which are designed to rotate the material as it leaves the hopper (18) through the bottom opening (20), so that it can be discharged through the discharge chute (40)

The rotary disc is driven by a motor shaft (68), driven by the motor (32).

Mounted on the top surface above the cutting surface (28) are launchers (30). Preferably 3 launchers are used. As an example, a 3½ inch long folded sheet metal is shown with a base attached through the cutting surface into the rotary disc by bolts (70). The launchers (30) on the disc have a leading angle (72) is inclined upward for a height of ¼ inch. The launchers are an important part of the invention which will be explained later. They are designed for upwardly propelling the nuts which return to the surface so that the cutting surface can make another cut in the shell. They can be made from various materials and other launchers that cause the nuts to have an upward movement may be used.

The hopper (18) fits closely on the inside of the housing (14), but can be adjusted up and down as will now be explained.

Surrounding the hopper (18) is an integral circular member (74), which also is closely fitted to the inside of the housing (14). This acts as a support for the conical hopper (18) and is also an adjustment shoulder. Underneath the circular member (74), on the outside of the hopper (18), are 3 adjustment plates (76) integral therewith which are spaced peripherally around the hopper. Each adjustment plate has an entry (78), downwardly tilted at both ends to permit the circular cam (80) to easily be placed in position so the circular cam (80) can assume the position as shown in FIG. 3. The diameter is slightly smaller than the spacing between the bottom of the circular member (74) and the top surface of the adjustment plate (76). The circular cam (80) is carried at the welded inner end (82) of the adjustment mechanism (34) which permits it to rotate with the adjustment mechanism (34) which is described in FIG. 4.

When it desired to remove or insert the hopper (18) in the housing (14), it is done by means of two openings (84). When the cover is removed, a thin rod (not shown) is inserted in the two openings (84), which are opposite each other on the inner surface of the hopper. Once the rod had been inserted in both openings, it is used to twist the hopper to a point that the three circular cams (80) are no longer riding on the adjustment plate (76). At that time the entire hopper can be lifted, and when desired to return the hopper, the same method can be used to reinsert it into the housing and then rotated so that the cam is captured between the circular member (74) and the adjustment plate (76). For ease of entry of the circular cam, both ends of the adjustment plates have an entry (78) to permit an easier rotation of the hopper (18) after the rod is removed, and the machine is ready for operation.

Figure 4:
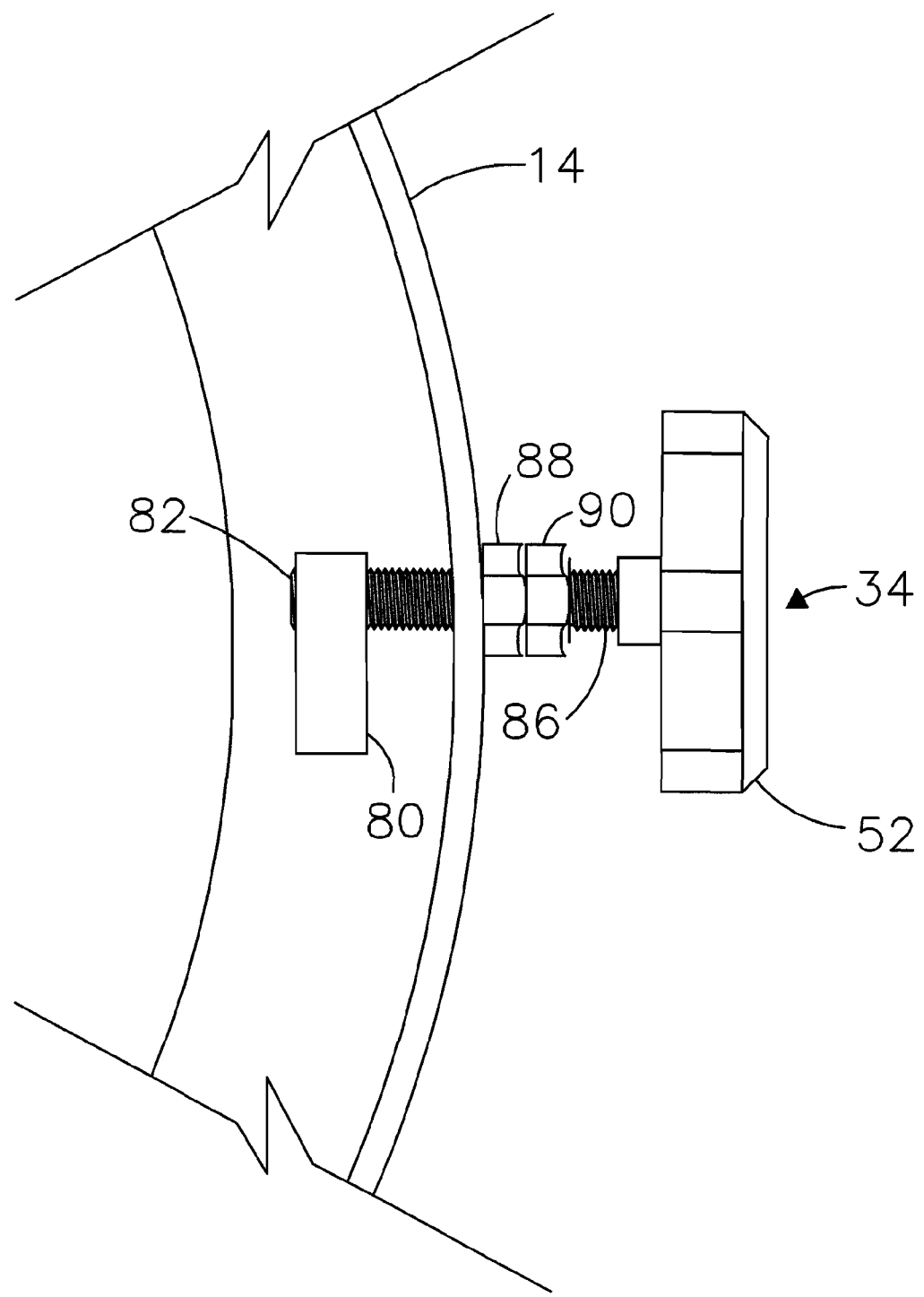
FIG. 4 is a schematic partial view of the side of the housing showing part of the adjustment mechanism for adjusting the space between the bottom opening of the hopper and the rotary disc.

With reference to FIGS. 3 and 4, the method of adjustment will be described. The adjustment mechanism (34) has an adjustment knob (52) affixed to a threaded adjustment screw (86), with the inner end welded to the circular cam (80). A welded nut (88) is welded to the outer surface of housing (14), and is mounted adjacent to a non-welded nut (90). When the knob is rotated, it will cause the circular cam (80) to change its position up and down, and when the position that is desired has been reached, the non-welded nut (90) can be tightened by a wrench against the nut (88) to lock it into place until it is desired to make another adjustment at a different time. As the circular cam (80) rotates upward, it carries the entire hopper upward, increasing the spacing between the bottom opening (20) of the hopper and the top surface (24) of the rotary disc (22).

When chinquapins are being shelled, since the normal ones are only approximately a half-inch in diameter, one option is for the openings to be slightly smaller than the outside diameter of the unshelled nut so that the shells can be removed and the shells and nuts may both be ejected between the bottom opening and the top surface of the rotary disc (22). When chestnuts are being shelled, the spacing would be larger by moving the hopper (18) upward, and most of these shells will be expelled through the opening, but the nuts will be mostly captured inside the hopper for dumping at a later time.

Figure 5:
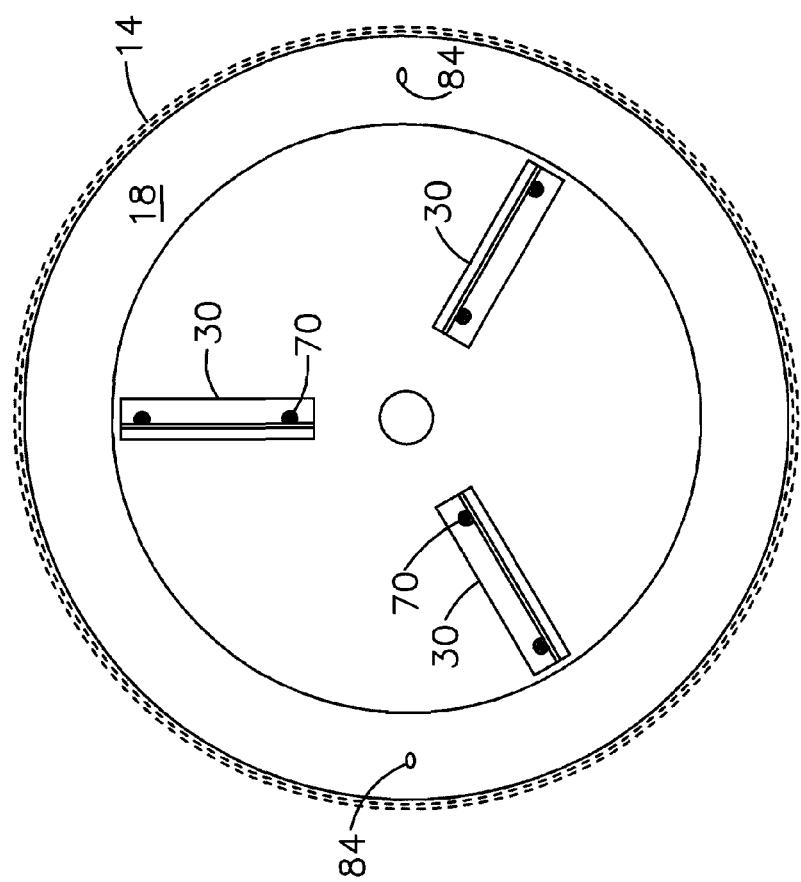
FIG. 5 is a view looking down into the hopper and the top of the cutting disc with the surrounding housing shown in dotted lines.

With reference to FIG. 5 there is shown a downward view of the hopper nested in the housing (14). The housing (14) is shown in dotted lines. As seen from the top, the two openings (84) for insertion of the rotating rod (not shown) to rotate the hopper (18) relative to the housing (14) in making the adjustments. Also seen in FIG. 5 are the three launchers (30) mounted on the top of rotary disc (22) by bolts (70).

Figure 6:
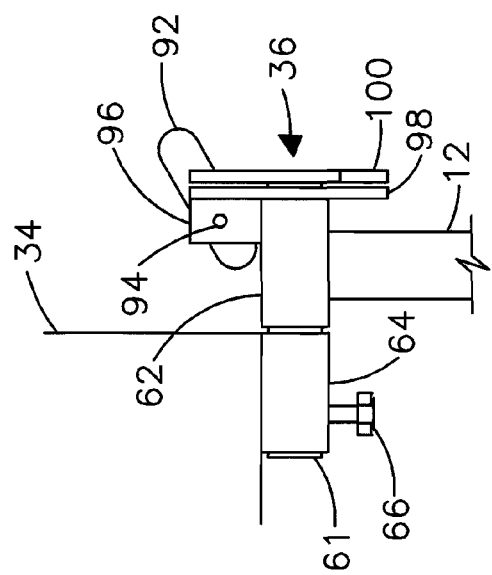
FIG. 6 is a schematic partial view of the tilting and locking mechanism.

With reference to FIG. 6, there is shown a schematic partial view of the tilting and locking mechanism (36), which has a pivot rod (61), a bearing (62), a pivot rod holder (64) and a set screw (66). The pivot rod (61) is a short axle locked at one end to the pivot rod holder (64) by a set screw (62) and the other ends projects through the bearing (62). The bearing is mounted to the top of the base (12) and is attached to fixed locking circular member (98). Also welded to the bearing (62) is the locking handle pivot support (96) which carries the locking handle pivot (94). The locking handle (92) pivots downward to form the locking function. The locking handle (92) is normally in a horizontal position, and the position where it is shown is where it has been slightly raised manually to unlock the tilting and locking mechanism. The weight of the handle is sufficient to pivot it downward around the pivot for the locking to take place. The rotating locking circular member (100) is affixed to the outboard end of pivot rod (61), and is thus connected to the housing (14) so that it pivots with housing (14).

With reference to FIG. 7 there is shown a schematic partial exploded view of the tilting and locking mechanism (36). Locking handle pivot (94) is carried by a locking handle pivot support (96) so that the locking handle (92) will pivot upward and downward. A fixed locking circular member (98) is affixed to the end of the housing 14 and contains the fixed slot (102). The pivot rod (61) has affixed to its end a rotating locking circular member (100). It has an outside periphery substantially the same diameter as the diameter of the fixed locking circular member (98), but it has a smaller circular arc (110) with a tilted stop shoulder (108) and a top stop shoulder (106) at the other end. There is a rotating slot (104) which has a bottom at the same distance from the axis of rotation as the bottom of the fixed slot (102) so that the locking handle when it is in its lowered and locking position, locks the fixed circular locking member (98) to the rotating locking circular member (100). This would be at the top position. In order to tilt the housing (14) to empty the contents, the locking handle (92) is raised and the housing is rotated clockwise until it is stopped by the stop shoulder (108). When it is desired to have the housing returned to the normal, upright position, it is simply rotated upward where it is automatically stopped by the stop shoulder (106) and the handle drops down to lock the position. It is unnecessary to lift the handle during the return motion as the weight of the locking handle (92) causes it to ride on the outside surface of the circular arc (110), and permitting it to automatically drop into position.

With reference to FIG. 8, there is shown the bottom of the housing (14), which is flat, but has at one end a discharge vane (38), which is located adjacent the outlet (40).

With reference to FIG. 9, there is shown the underside of rotary disc (22), which has 3 rotating discharge vanes 42 which take the material that leaves the space between the bottom of the hopper (18) and the top of the rotary disc (22), which material is then thrown outward and propelled in a circular motion where it is grabbed by the discharge vane (38) and directed though the discharge chute (40).

Figure 10:
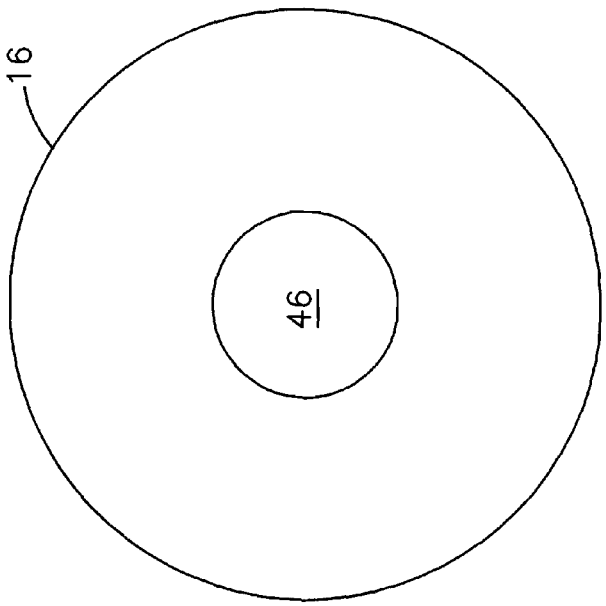
FIG. 10 is a top view of the cover.
Figure 11:
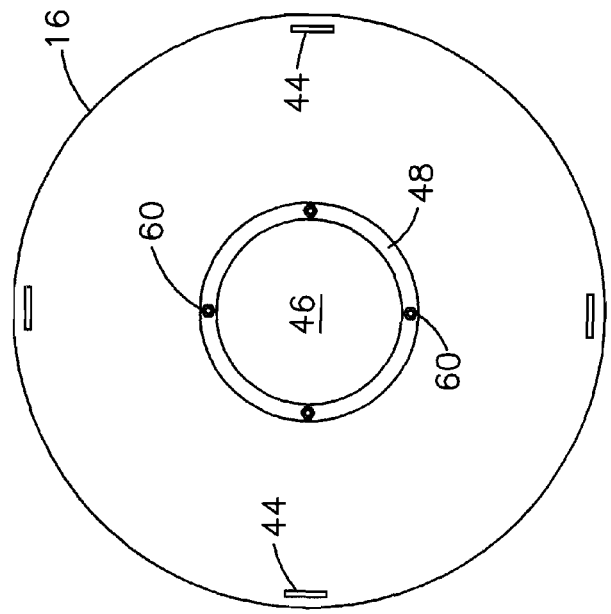
FIG. 11 is a bottom view of the cover showing the spacing lugs, transparent window and holding ring.
Figure 12:
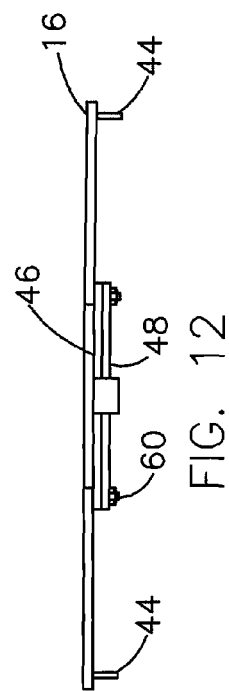
FIG. 12 shows a side view of FIG. 11.

With references to FIGS. 10, 11 and 12, there is shown a top view of the cover (16), bottom view of the cover (16) and a side view of the cover (16). As seen from the top, there is a transparent window (46), which is held in place from the bottom by a holding ring (48) that is mounted to the underside of the cover by holding tabs (60). Also seen on the underside of cover (16) are 4 spacing lugs (44), which center the cover inside the housing (16) when the cover is placed in position.

The launcher (30) is an important part of the invention since it must move the nuts upwardly and let them fall downward to permit another cut of the shell. This upward movement of the nut is preferably done by variation of the launcher (30), but can be launched by upstanding screw heads, undulating shapes of the cutting surface, and other methods that impart an upward movement of the nut that permits it to fall downward again to the cutting surface.

In operation, the machine and its method of use, enable the shelling of chinquapins, chestnuts and similar nuts in a relatively simple manner.

In operation, the user may, by way of example, use 3 to 3½ pounds of nuts piled in two to three layers and shelled at the rate of 800 to 850 RPM for four minutes.

With reference to FIG. 5, an alternative to the rotary disc 22 with a cutting source 28 available from Norton USA, Worchester, Mass. is to use an abrasive surface made, by example, a 12¼ inch diameter by ¼ inch thick aluminum plate having abrasive ⅛ inch diameter raised portions 3/64 inch high spaced approximately ⅜ inch from each other over the surface of the plate. This makes an easy to clean rotary disc. The launchers 30 and rotating discharge vanes 42 would be attached to the aluminum plate.

The aluminum plate, which may instead be stainless steel, is made by Ross Technology Corporation of Pennsylvania using symmetrical laser deposition into the aluminum substrate.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A nut shelling machine comprising:
   a base;
   a housing for said machine mounted on said base, said housing having a bottom surface and an upright side;
   a cover for said housing;
   a hopper inside said housing;
   a bottom opening on said housing;
   a rotary disc under said bottom opening, said rotary disc having a top surface and a bottom surface;
   a cutting surface on said top surface of said rotary disc, said cutting surface carried by and rotated by said rotary disc;
   launchers on said cutting surface to launch nuts in an upward direction; and
   a motor for rotating said rotary disc.

2. The nut shelling machine of claim 1 wherein said motor is a variable speed motor and includes a variable speed controller with an on-off switch.

3. The nut shelling machine of claim 1 wherein said launcher is an abrasive disc.

4. The nut shelling machine of claim 1 wherein said launchers are a raised surface carried by said abrasive disc.

5. The nut shelling machine of claim 1 including a pivot arrangement enabling said housing to be pivoted about said base to permit dumping the contents of said housing.

6. The nut shelling machine of claim 1 wherein said cover includes a transparent window.

7. The nut shelling machine of claim 1 wherein said rotary disc is aluminum or stainless steel.

8. The nut shelling machine of claim 1 including
   an upright position and an emptying position;
   a tilting and locking mechanism that enables pivoting and locking said housing in said upright position or said emptying position;
   said tilting and locking mechanism including a locking handle that permits rotation of said housing from said upright position to said emptying position and vice versa; and
   said tilting and locking mechanism including a top stop shoulder that automatically locks said housing when it is rotated to said upright position.

9. The nut shelling machine of claim 1 wherein said motor is attached directly to said bottom of said housing.

10. The nut shelling machine of claim 1 which contains an adjustment mechanism carried by said hopper and said housing for varying the spacing between said hopper opening and said rotary disc.

11. The nut shelling machine of claim 10 wherein said adjustment mechanism includes
   an adjustment knob affixed to a threaded adjustment screw;

a circular cam secured to said end of said threaded adjustment screw; and a nut welded to said outer surface of said housing adjacent to a non-welded nut;

whereby rotation of said adjustment knob causes said circular cam to change its position up and down thereby carrying said hopper with it and adjusting the spacing between said bottom opening said hopper and said top surface of said rotary disc.

12. The nut shelling machine of claim 1 including a discharge chute mounted on said housing;

a discharge vane mounted on said housing adjacent said discharge chute; and rotating discharge vanes located on said bottom surface of said rotary disc for propelling shells against said discharge vane and thence out said discharge chute.

13. The nut shelling machine of claim 1 which includes a spacing on said housing above said rotating disc; and said spacing is a predetermined distance of between ¼ inch to ⅞ inch to permit smaller spheroidal nuts such as the chinquapin to be directly discharged between said spacing.

14. The nut shelling machine of claim 1 wherein said rotating disc is 12 inches in diameter and is constructed of aluminum oxide.

15. The nut shelling machine of claim 1 wherein said launchers are radial metal straps of a height between ¼ inch and 3½ inch.

\* \* \* \* \*